Nov. 28, 1967  J. F. GARDNER ETAL  3,355,381
REMOVING OLEFINS FROM MOLECULAR SIEVE DESORPTION GAS
Filed Oct. 28, 1966
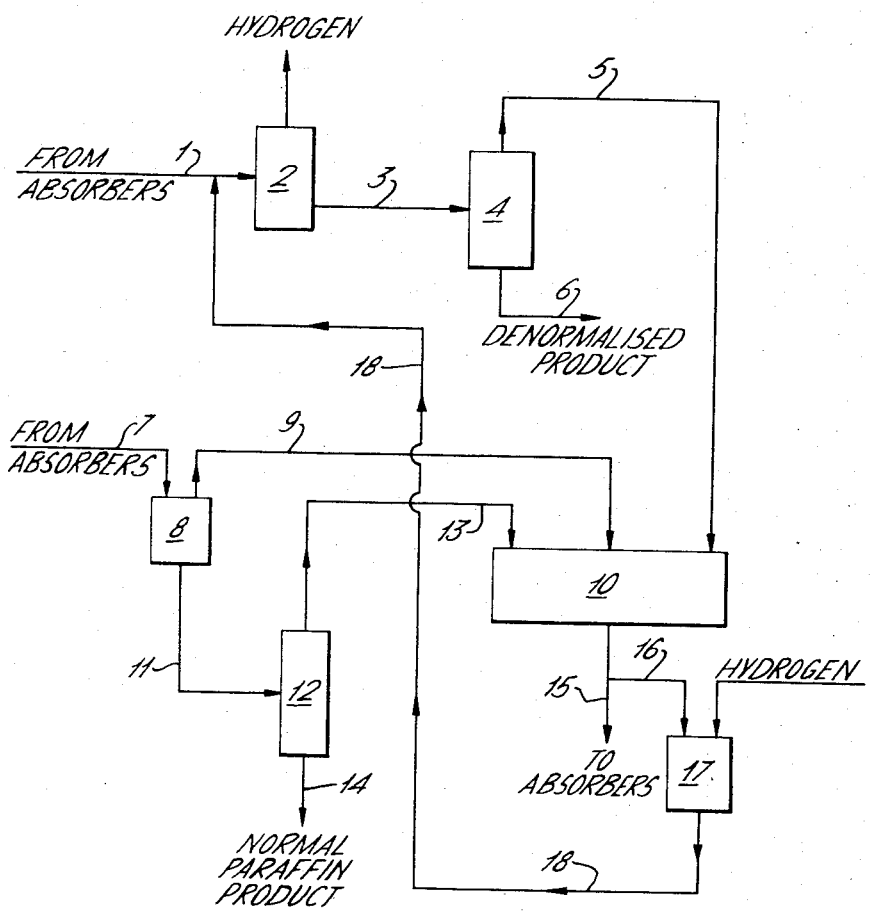
INVENTORS.
JOHN FRANCIS GARDNER
PAUL ANTHONY LAWRENCE
JOHN NEIL TURNBULL
BY
MORGAN, FINNEGAN, DURHAM & PINE
ATTORNEYS United States Patent Office 3,355,381
Patented Nov. 28, 1967

3,355,381
REMOVING OLEFINS FROM MOLECULAR SIEVE DESORPTION GAS
John Francis Gardner, Thames Ditton, Surrey, Paul Anthony Lawrence, Stanwell, Middlesex, and John Neil Turnbull, Twickenham, Middlesex, England, assignors to The British Petroleum Company Limited, London, England, a corporation of England
Filed Oct. 28, 1966, Ser. No. 590,277
Claims priority, application Great Britain, Nov. 4, 1965, 46,754/65
7 Claims. (Cl. 208—310)

This invention relates to separation processes using molecular sieves, particularly to such processes for separating normal paraffins from petroleum fractions.

It is well known that certain natural and synthetic zeolites have the property of preferentially absorbing certain types of hydrocarbons. These zeolites, known as molecular sieves, have crystalline structures containing a large number of pores of uniform size. In different zeolites, these pores may vary from 3 A. to 15 A. or more in diameter, but in any one zeolite the pores will be of substantially uniform size.

It has previously been proposed to treat petroleum fractions ranging from gasoline to gas-oils and higher with molecular sieves having pore diameters ranging from 4 A. to 15 A. To separate straight chain hydrocarbons from branched chain and/or cyclic hydrocarbons a molecular sieve having pore diameters of 5 A. is suitable. Such a process may be used to recover a denormalized fraction, for example gasoline of improved octane number due to the removal of low octane normal paraffins. The absorbed straight-chain material may also be recovered as a product if desired, for example normal paraffins boiling in the kerosine and gas-oil ranges may be recovered for use in the production of biologically soft detergents.

One example of a suitable process using molecular sieves is described in our U.K. patent specification No. 944,441. This specification describes an isothermal process for the separation of straight-chain hydrocarbons from petroleum fractions boiling in the $C_{10}$–$C_{20}$ range comprising contacting the fraction with a 5 A. molecular sieve in a first stage to absorb straight-chain hydrocarbons, contacting the sieve with a purging medium in a second stage to remove material adsorbed on the surface of the sieve or held interstitially between sieve particles, desorbing the absorbed hydrocarbons in a third stage using either n-pentane or n-butane as desorbing medium, all three stages being in the vapour phase, the pressure in the desorption stage being equal to, or greater than, the pressure in the absorption stage.

A further example of a suitable process, which operates under different conditions, is described in our U.K. patent specification No. 1,026,116. This process, for separating straight-chain hydrocarbons from mixtures of the same with branched chain and/or cyclic hydrocarbons, the mixtures boiling within the range $C_4$–450° C., comprises contacting the mixture with a fixed bed of 5 A. molecular sieve in a first stage to absorb selectively the straight-chain hydrocarbons, purging the sieve bed in a second stage to remove surface-adsorbed and interstitially held hydrocarbons from the sieve bed, and desorbing the absorbed straight-chain hydrocarbons in a third stage, all three stages being conducted isothermally in the vapour phase, purging and desorption being effected by pressure variation alone.

According to the present invention, in a cyclic process employing molecular sieves to separate straight chain hydrocarbons from branched chain and/or cyclic hydrocarbons, in which process the circulation of desorbing and/or purging medium is effected, and in which process olefins tend to build up in the circulation system to an equilibrium level, the olefin concentration is controlled by hydrogenating at least a proportion of the olefins in the circulation system, thereby maintaining the olefin concentration at a level below the equilibrium level.

In cyclic molecular sieve hydrocarbon separation processes it has been found that olefins tend to build up in the circulating media employed, i.e. the purging and desorbing media. For example in the process described in U.K. patent specification No. 944,441, olefins build up in the circulating purging medium, e.g. nitrogen, and also in the circulating desorbing medium, e.g. n-pentane; olefins also appear, but of course do not circulate, in the hydrocarbon products of the process.

It has also been found in commercial operations that the sieve deactivation rate, i.e. the rate at which the capacity of the sieve for absorbing hydrocarbons falls away, is at least partly attributable to the presence of olefins in the system. By removing at least a proportion of these olefins from the circulatory system, therefore, the sieve deactivation rate can be reduced and the useful life of the sieve between regenerations thereby extended.

Surprisingly it has been found that it is not necessary to remove all, or even a major part, of the olefins in order to reduce significantly the sieve deactivation rate. For example, in the process described in U.K. patent specification No. 944,441 it has been found during commercial operation that the olefin concentration in the desorbing medium if unchecked rises to a value which will depend upon the feed rate and the make up rate of desorbing medium. In a typical system it may rise to an equilibrium level of about 2% weight; in such a case a relatively small reduction, particularly of the heavy olefins, to give for example a total olefin concentration of about 1.5% weight, can lead to a substantial reduction in sieve decay rate.

It is known that molecular sieves will promote cracking of hydrocarbons at temperatures of the order of 350° and above so that at the temperatures normally employed in molecular sieve separation processes, viz. 350°–380° C., some cracking of the hydrocarbons is normally to be expected. A substantial part, therefore of the olefin build up in the circulating streams is the result of this breakdown or cracking.

The circulating olefins include light, i.e. normally gaseous, olefins which circulate with the low boiling purging medium and also heavier olefins which tend to circulate with the desorbing medium. It is believed that the sieve deactivation is caused mainly by the heavier olefins which build up in the circulating desorbing medium rather than the lighter olefins, and preferably, therefore, efforts are concentrated on removing the olefins from the circulating desorbing medium.

A number of methods may be employed for reducing the olefin level, for example absorption in a suitable medium such as sulphuric acid, hydrogenation or distillation. The actual method preferred in a given case, and the extent of olefin removal consistent with adequate reduction of the sieve deactivation rate, will be determined at least partly by economic considerations. For example a suitable method for controlling the olefin content of the circulating desorbing medium by a distillation method is described in our co-pending U.K. patent application No. 46,755/65 of even date herewith.

In certain cases it is preferred to control the olefin concentration by a hydrogenation method. In particular, hydrogenation is attractive when a supply of hydrogen is readily available as is the case in many petroleum refineries.

The method of the present invention is especially preferred where the molecular sieve separation process itself uses hydrogen as the purging medium, in which case the hydrogen is of course available on the plant itself.

As stated above it is not necessary to hydrogenate all of the circulating olefins. The hydrogenation reaction itself may employ known hydrogenation catalysts such as, for example, components including oxides or sulphides of Group VIA and metals, oxides or sulphides of Group VIII. These may be supported on any suitable carrier such as alumina, silica, kieselguhr, or clays.

A nickel/sepiolite catalyst is preferred when the stream concerned is substantially sulphur-free; for treating sulphur-containing streams a catalyst comprising cobalt and molybdenum oxides supported on alumina is preferred. These catalysts are not novel per se, but are known hydrogenation catalysts.

The hydrogenation conditions may be within the following ranges:

| | |
|---|---|
| Temperature, °F. | Ambient—750 |
| Pressure, p.s.i.g. | 0–6000 |
| Space velocity, v./v./hr. | 0.1–20 |
| Hydrogen rate, s.c.f./b. | 200–20,000 |

However it is convenient for use with the molecular sieve process to operate within the following ranges:

| | |
|---|---|
| Temperature, °F. | 100–600 |
| Pressure, p.s.i.g. | 50–500 |
| Space velocity, v./v./hr. | 0.5–10 |
| Hydrogen rate, s.c.f./b. | 400–4000 |

One example of a suitable arrangement in accordance with the present invention is illustrated with reference to the accompanying drawing which shows schematically the relevant parts of a cyclic absorption separation plant employing molecular sieves, which parts are downstream of the molecular sieve containing absorber vessels.

The process illustrated employs a hydrogen purging medium and n-pentane as desorbing medium in accordance with the process described in our U. K. patent specification No. 944,441.

In the drawing, a denormalized hydrocarbon fraction containing n-pentane and hydrogen together with undesirable olefins, obtained from the purge stage of the absorptive separation process, passes via line 1 from the absorbers (not shown) to hydrogen separator 2 from which hydrogen is removed overhead. The denormalized fraction containing n-pentane and olefins passes via line 3 to stripper 4 from which n-pentane is removed overhead via line 5 and passed to storage drum 10, and the final denormalized product is removed as a bottoms product via line 6. The conditions in the stripper 4 are preferably adjusted to concentrate the olefins in the overhead n-pentane offtake.

Normal paraffins containing n-pentane and olefins, obtained from the desorption stage of the absorptive separation process, pass via line 7 to flash-pot 8 from which some n-pentane passes overhead via line 9 to storage drum 10. Normal paraffins, olefins and the remaining n-pentane pass via line 11 to stripper 12. The conditions in the stripper 12 are also preferably adjusted to concentrate the olefins in the overhead n-pentane offtake which passes via line 13 to storage drum 10. The normal paraffin product is removed as a bottoms product from stripper 12 via line 14.

N-pentane is removed from storage drum 10 and recirculated to the absorbers via line 15. A portion of this n-pentane is however drawn off along line 16 to the hydrogenating reactor 17 in which any olefins present in the n-pentane stream are hydrogenated. The hydrogenated product is passed via line 18 to hydrogen stripper 2 wherein any hydrogen present in the hydrogenated n-pentane stream is removed.

The invention is further illustrated with reference to the following examples:

*Example 1*

In the process hereinbefore described with reference to the drawings, the circulating n-pentane stream having a bromine number of 3.6 and a total sulphur content (Wickbold method) of 4.2 p.p.m. was hydrogenated over a nickel formate on sepiolite catalyst under the following conditions:

| | |
|---|---|
| Temperature, °C. | 100 |
| Pressure (reactor inlet), p.s.i.g. $H_2$ | 100 |
| Space velocity, v./v./hr. | 1.0 |
| Hydrogen rate, s.c.f./b. | 1000 |

The catalyst was pretreated by heating under a flow of 40 litres/hour of hydrogen at 20 p.s.i.g. from ambient temperature to 250° C. at a heating rate of 30° C. per hour. Hydrogen flow was maintained at 250° C. for 4 hours.

Over a 320 hour period under the above conditions a n-pentane stream was obtained having a bromine number of 0.01 and sulphur content (Wickbold) varying between 0.4 and 1.0 p.p.m.

The pressure was then increased to 300 p.s.i.g. The bromine number of the product rose almost immediately to 0.02 and over the next 120 hours to 0.46. The temperature was then raised by 135° C., which halted the increase in bromine number for 130 hours. During the next 100 hours, however, the bromine number increased to 0.07. The temperature was then increased to 145° C. but the bromine number continued to rise over the next 80 hours to 1.97. Increasing the temperature to 200° C. failed to reduce the bromine number over the next 90 hours.

The temperature was then increased to 260° C. and over the next 100 hours the bromine number was reduced to 0.02, and maintained over a further 200 hours at a level between 0.02 and 0.05.

During the latter 400 hours the sulphur content varied between 0.7 and 2.3 p.p.m., tending to keep station with the changing bromine number.

Thus the nickel formate on sepiolite catalyst had a good initial activity, but the presence of sulphur in the feed stream necessitated a continual increase in temperature.

*Example 2*

The n-pentane stream of Example 1 was hydrogenated over a catalyst comprising cobalt (2.5% wt.) and molybdenum (14% wt.) on ⅛ inch alumina equant pellets, calcined in air at 550° C. for two hours. The hydrogenation was carried out under the following conditions:

| | |
|---|---|
| Temperature, °C. | 260 |
| Pressure (reactor inlet), p.s.i.g. $H_2$ | 250 |
| Space velocity, v./v./hr. | 1.0 |
| Hydrogen rate, s.c.f./b. | 300 |

Over a 450 hours period under the above conditions a n-pentane stream was obtained having a bromine number of 0.01 and a sulphur content varying between 0.5 and 1.0 p.p.m.

We claim:
1. In a cyclic process employing molecular sieves to separate straight chain hydrocarbons from branched chain and cyclic hydrocarbons, in which process the circulation of desorbing and purging medium is effected, and in which process olefins tend to build up in the circulating desorbing medium to an equilibrium level, the olefin concentration is controlled by hydrogenating at least a proportion of the olefins in the circulating desorbing medium, thereby maintaining the olefin concentration at a level below the equilibrium level.

2. A process as claimed in claim 1 wherein the purging medium is hydrogen.

3. A process as claimed in claim 1 wherein the olefin content of the circulating desorbing medium is limited to a level of about 75% of the equilibrium level.

4. A process as claimed in claim 1 wherein the hydrogenation is carried out in the presence of a catalyst comprising nickel supported upon sepiolite.

5. A process as claimed in claim 1 wherein the hydrogenation is carried out in the presence of a catalyst comprising cobalt and molybdenum oxides supported on alumina.

6. A process as claimed in claim 1 wherein the hydrogenation is carried out at a temperature between ambient and 750° F., a pressure between 0 and 6000 p.s.i.g., a space velocity between 0.1 and 20 v./v./hr., and a hydrogen rate of between 200 and 20,000 s.c.f./b.

7. A process as claimed in claim 6 wherein the hydrogenation is carried out at a temperature between 100° and 600° F., a pressure between 50 and 500 p.s.i.g., a space velocity between 0.5 and 10 v./v./hr., and a hydrogen rate between 400 and 4000 s.c.f./b.

References Cited

UNITED STATES PATENTS 3,081,255   3/1963   Hess et al. _____ 260—676

HERBERT LEVINE, *Primary Examiner.*